United States Patent
Lee et al.

(10) Patent No.: US 11,632,076 B2
(45) Date of Patent: Apr. 18, 2023

(54) SOLAR POWER GENERATION SYSTEM AND TEST METHOD

(71) Applicant: DELTA ELECTRONICS, INC., Taoyuan (TW)

(72) Inventors: Lei-Ming Lee, Taoyuan (TW); Xin-Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 178 days.

(21) Appl. No.: 17/087,586

(22) Filed: Nov. 2, 2020

(65) Prior Publication Data
US 2021/0351743 A1    Nov. 11, 2021

(30) Foreign Application Priority Data
May 8, 2020    (CN) .......................... 202010383425.0

(51) Int. Cl.
| | |
|---|---|
| *H02S 50/10* | (2014.01) |
| *H02M 3/155* | (2006.01) |
| *H02M 7/797* | (2006.01) |
| *H02J 3/38* | (2006.01) |

(52) U.S. Cl.
CPC .............. *H02S 50/10* (2014.12); *H02J 3/381* (2013.01); *H02M 3/155* (2013.01); *H02M 7/797* (2013.01); *H02J 2300/24* (2020.01)

(58) Field of Classification Search
CPC ....... H02S 50/10; H02J 3/381; H02J 2300/24; H02M 3/155; H02M 7/797; Y02E 10/56
See application file for complete search history.

(56) References Cited

U.S. PATENT DOCUMENTS

| | | | |
|---|---|---|---|
| 9,413,174 B2 | 8/2016 | Gostein et al. | |
| 10,389,300 B2 | 8/2019 | Ko et al. | |
| 2009/0303763 A1 | 12/2009 | Yuguchi et al. | |
| 2011/0005567 A1* | 1/2011 | VanderSluis | H02J 3/381 |
| | | | 136/244 |

(Continued)

FOREIGN PATENT DOCUMENTS

| | | |
|---|---|---|
| CN | 201479008 U | 5/2010 |
| CN | 103339521 A | 10/2013 |
| CN | 104158154 A | 11/2014 |

(Continued)

OTHER PUBLICATIONS

The pertinent parts of US20170294877A1.

*Primary Examiner* — Toan T Vu
(74) *Attorney, Agent, or Firm* — CKC & Partners Co., LLC

(57) ABSTRACT

A test method for testing a solar power generation system is provided. The solar power generation system includes a DC to AC converter and a control unit. The DC to AC converter is electrically coupled between an external power grid and a solar panel. The control unit is configured to control the DC to AC converter to switch between a power generation mode and a test mode. When in the power generation mode, a photoelectric energy generated by the solar panel is provided to the external power grid via the DC to AC converter. When in the test mode, the control unit controls the DC to AC converter to generate a testing electrical energy by obtaining from the external power grid, to effect a test result of the solar panel when the testing electrical energy passes through the solar panel.

20 Claims, 14 Drawing Sheets

(56) References Cited

U.S. PATENT DOCUMENTS

2012/0049855 A1   3/2012  Crites
2017/0294877 A1  10/2017  Chang et al.

FOREIGN PATENT DOCUMENTS

| | | |
|---|---|---|
| CN | 104320077 A | 1/2015 |
| CN | 106953538 A | 7/2017 |
| CN | 107425811 A | 12/2017 |
| CN | 109088542 A | 12/2018 |
| CN | 110138014 A | 8/2019 |
| CN | 209562512 U | 10/2019 |
| TW | 200519557 A | 6/2005 |
| TW | M77596 U | 4/2010 |
| TW | 201911737 A | 3/2019 |

\* cited by examiner

SOLAR POWER GENERATION SYSTEM AND TEST METHOD

CROSS-REFERENCE TO RELATED APPLICATION

This application claims priority to Chinese Application Serial Number 202010383425.0 filed May 8, 2020, which is herein incorporated by reference in its entirety.

BACKGROUND

Technical Field

The present disclosure relates to a solar power generation system and a test method, especially a technology for testing whether a solar panel is abnormal.

Description of Related Art

The principle of a solar power generation system is to use a solar panel made of optoelectronic semiconductors to absorb sunlight and to convert light energy into electrical energy to output voltage or current. However, after the solar power generation system has been in operation for a long period of time, the solar panel may be degraded because of various factors, for example, damage caused by falling foreign objects or failure of internal components. Therefore, it is desirable for the solar power generation system to undergo regular testing to ensure normal operation.

SUMMARY

One aspect of the present disclosure is a test method for testing a solar power generation system, wherein the solar power generation system comprises a solar panel and a DC to AC converter, when the DC to AC converter is in a power generation mode, a photoelectric energy generated by the solar panel is provided to an external power grid via the DC to AC converter, the test method includes: providing the DC to AC converter in a test mode, wherein the test mode is different to the power generation mode; controlling the DC to AC converter to obtain an electrical energy from the external power grid and to generate a testing electrical energy; and providing the testing electrical energy to the solar panel, so that a test device obtains a test result of the solar panel when the testing electrical energy passes through the solar panel.

Another aspect of the present disclosure is a solar power generation system, including a DC to AC converter and a control unit. The DC to AC converter is electrically coupled between an external power grid and a solar panel. The control unit is electrically coupled the DC to AC converter, and is configured to control the DC to AC converter to switch between a power generation mode and a test mode. When the DC to AC converter is in the power generation mode, a photoelectric energy generated by the solar panel is provided to the external power grid via the DC to AC converter. When the DC to AC converter is in the test mode, the control unit controls the DC to AC converter to generate a testing electrical energy by obtaining from the external power grid, and provides the testing electrical energy to the solar panel to effect a test result of the solar panel when the testing electrical energy passes through the solar panel.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Embodiments of the present disclosure are described below in more detail with the accompanying drawings, and serves merely as examples, and do not limit the scope of the present disclosure. Moreover, the operation of the described structure is not limited to the order of implementation. Any device with equivalent functions that is produced from a structure formed by a recombination of elements is intended to be covered by the scope of the present disclosure. Drawings are for the purpose of illustration only, and are not to scale.

It will be understood that when an element is referred to as being "connected to" or "coupled to", it can be directly connected or coupled to the other element, or intervening elements may be present. In contrast, when an element to another element is referred to as being "directly connected" or "directly coupled", there are no intervening elements present. As used herein, the term "and/or" includes an associated listed items or any and all combinations of more.

Figure 1:
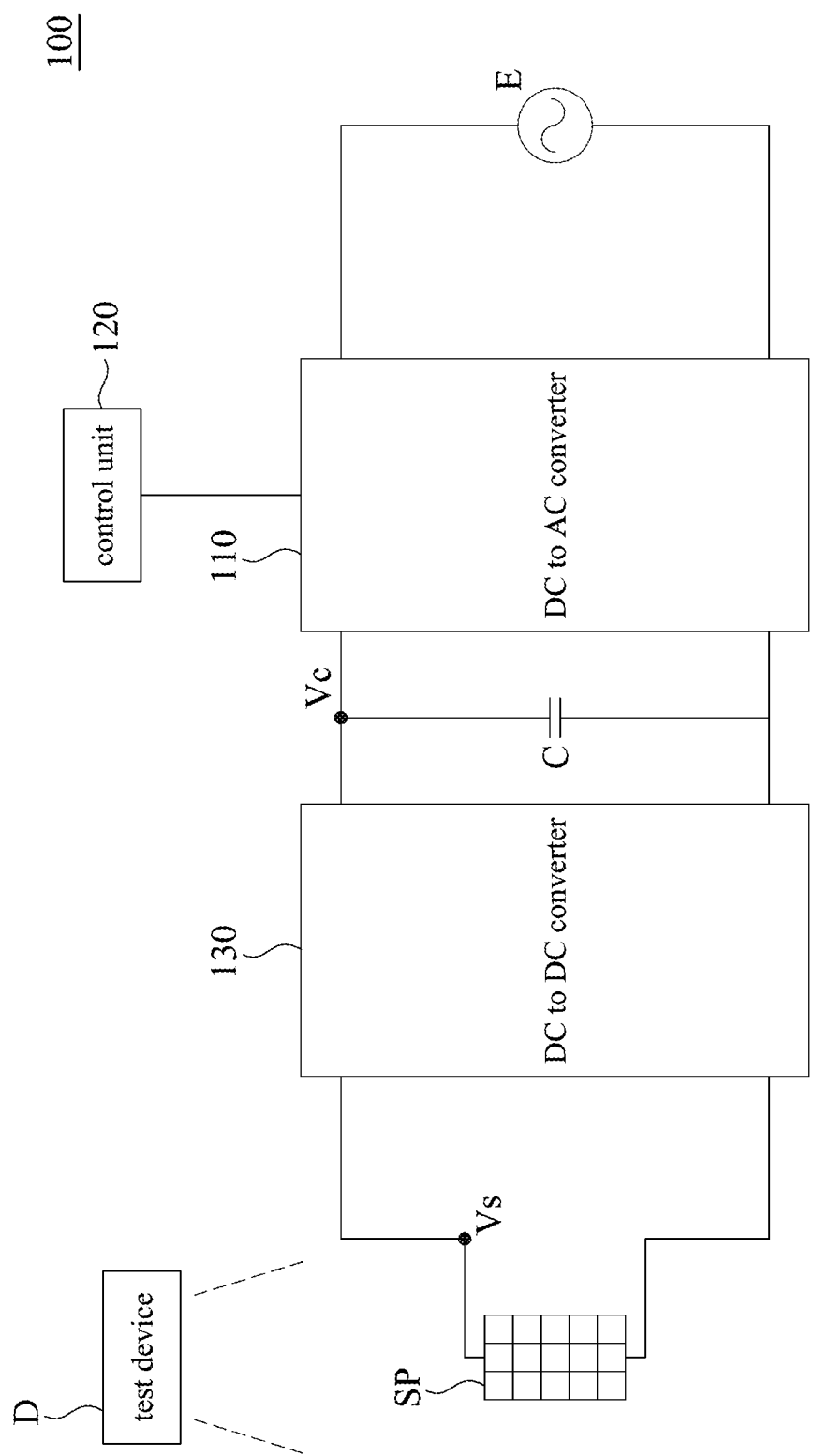
FIG. 1 is a schematic diagram of a solar power generation system according to one or more embodiments of the present disclosure.

Referring to FIG. 1, in one embodiment, a solar power generation system 100 includes at least a solar panel SP, a direct-current to alternating-current (DC to AC) converter 110 and a control unit 120. The DC to AC converter 110 is electrically coupled between an external power grid E and the solar panel SP, and the control unit 120 is electrically coupled to the DC to AC converter 110. When the solar panel SP is exposed to sunlight, the solar panel SP generates voltage or current according to the photoelectric effect. In order to facilitate the description of the present disclosure, the above state of power generation is hereinafter referred to as a "power generation mode" of the solar power generation system 100 or the DC to AC converter 110. In addition, since those skilled in the art can understand the structure and principle of the solar panel SP, it will not be further described herein. In addition to the above "power generation mode", when the solar panel SP is not exposed to sunlight or not operating to generate power, the solar power generation system 100 can receive an electrical energy from an external power grid E via the DC to AC converter 110, so that the DC to AC converter 110 may supply electrical energy towards the solar panel SP. By use of said supply of electrical energy, it is possible to undertake test of the solar panel SP. The above test process is hereinafter referred to as a "test mode" of the solar power generation system 100 or the DC to AC converter 110.

In one embodiment, the control unit 120 is configured to control the DC to AC converter 110 to switch between the "power generation mode" and the "test mode". Alternatively stated, when the DC to AC converter 110 is in "the power generation mode", the photoelectric energy generated by the solar panel SP will pass through the DC to AC converter 110 and be transmitted to the external power grid E. On the other hand, when the DC to AC converter 110 is in the "test mode", the control unit 120 may control the DC to AC converter 110 to use energy from the external power grid E to provide a testing electrical energy for use to test the solar panel SP. With the solar panel SP receiving the testing electrical energy, the electrical characteristics (e.g., voltage, current, impedance) or physical state (temperature) of the solar panel SP may be detected by a test device D, to test whether any part of the solar panel SP is abnormal. In one embodiment, the control unit 120 is configured to perform various operations or determinations, and can be realized by a microcontroller, a microprocessor, a digital signal processor, an application specific integrated circuit (ASIC) or a logic circuit.

In some embodiments, the testing device D is configured to detect and determine if the magnitude of the testing electrical energy (e.g., testing current or voltage) supplied to the solar panel SP is in accordance with the desired testing parameter/s. The test device D may also include a thermal imager or a spectrum analyzer. In the test mode, the thermal imager or the spectrum analyzer is configured to capture a detection image of the solar panel SP receiving the testing electrical energy. Then, by the test device D or using another analysis instruments, the detection image is analyzed to determine whether status of one or more parts of the solar panel SP is normal or abnormal (e.g., using colors presented by the detection image to determine the temperature of the solar panel SP, which indicates normality or abnormality). The solar power generation system 100 of the present disclosure is capable of "reversely" supplying power towards the solar panel SP. Such "reverse powering" (i.e., obtains energy of the external power grid E via the DC to AC converter 110 and supply power to the solar panel SP) may be used to effect a change to the electrical characteristics or physical state of the solar panel SP (or multiple solar panels SP). When applied to numerous solar panels SP, an inspector may test/detect the multiple solar panels SP using the test device D, and do it easily and expediently to significantly improve testing efficiency.

As shown in FIG. 1, in some embodiments, the solar power generation system 100 further includes a direct-current to direct-current (DC to DC) converter 130. The DC to DC converter 130 is electrically coupled between the solar panel SP and the DC to AC converter 110 (e.g., coupled to a connection node Vs of the solar panel SP and a bus Vc, respectively) for converting an electrical energy generated by the solar panel SP. In operation, when in the power generation mode, a first DC voltage generated by the solar panel SP is converted to a second DC voltage by the DC to DC converter 130. The second DC voltage is converted to an output AC voltage by the DC to AC converter 110, and the output AC voltage is supplied to the external power grid E. Note that the present disclosure is not limited to this, and in other embodiments, the DC to AC converter 110 may also be directly coupled to the solar panel SP without the DC to DC converter 130.

In some embodiments, the solar power generation system 100 includes an energy storage capacitor C electrically coupled between the solar panel SP and the DC to AC converter 110. In other embodiments, the energy storage capacitor C may also be coupled in parallel to the DC to AC converter 110 and the DC to DC converter 130. When in the test mode, the energy storage capacitor C cooperates with the DC to AC converter 110 to provide the testing electrical energy to the solar panel SP. For example, the DC to AC converter 110 converts the electrical energy obtained from the external power grid E into a DC voltage, and the energy corresponding to the DC voltage is stored in the energy storage capacitor C. Then, the testing electric energy (or part of the testing electrical energy) is supplied by discharging the energy storage capacitor C.

Figure 2A:
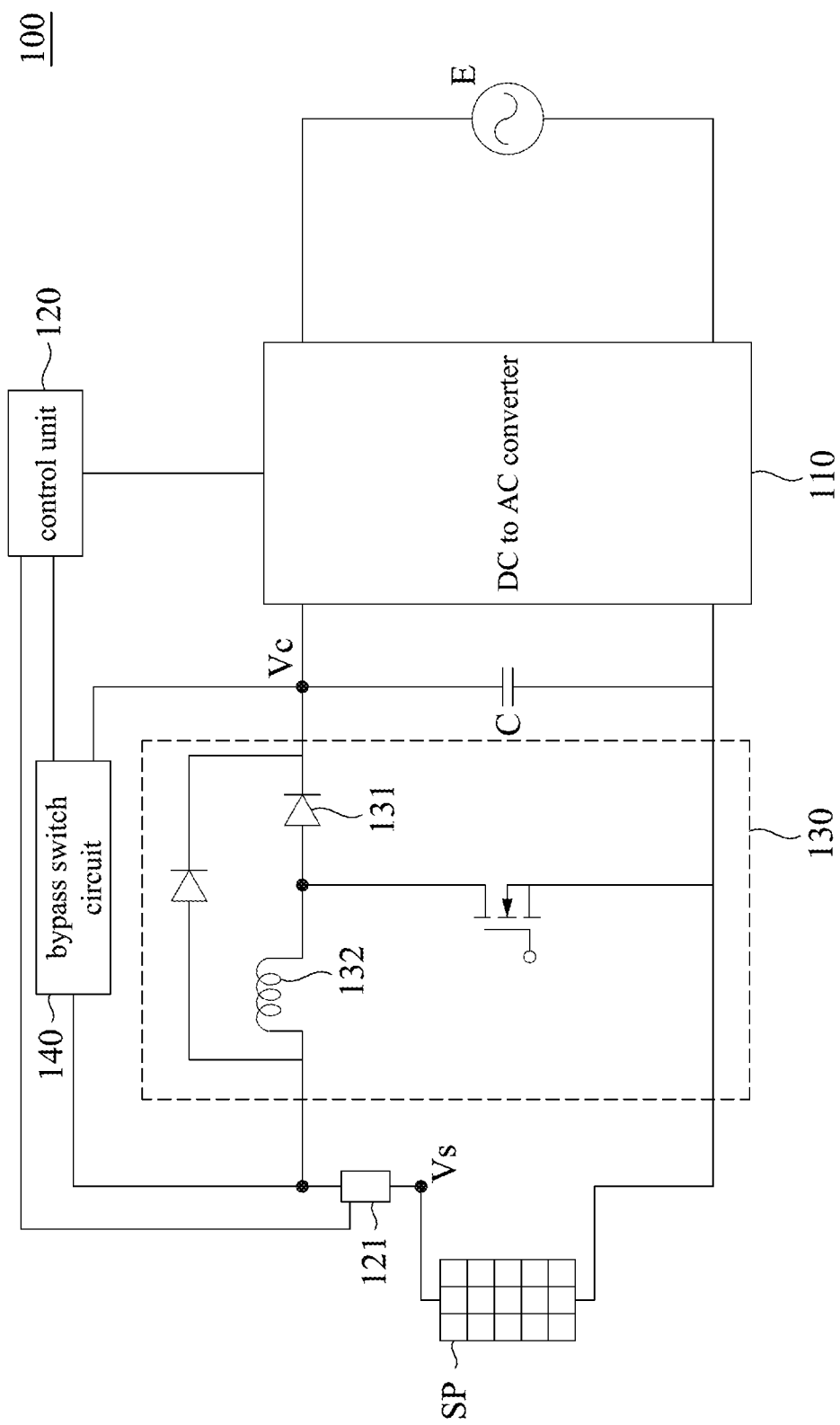
FIG. 2A is a schematic diagram of a solar power generation system according to one or more embodiments of the present disclosure.
Figure 2B:
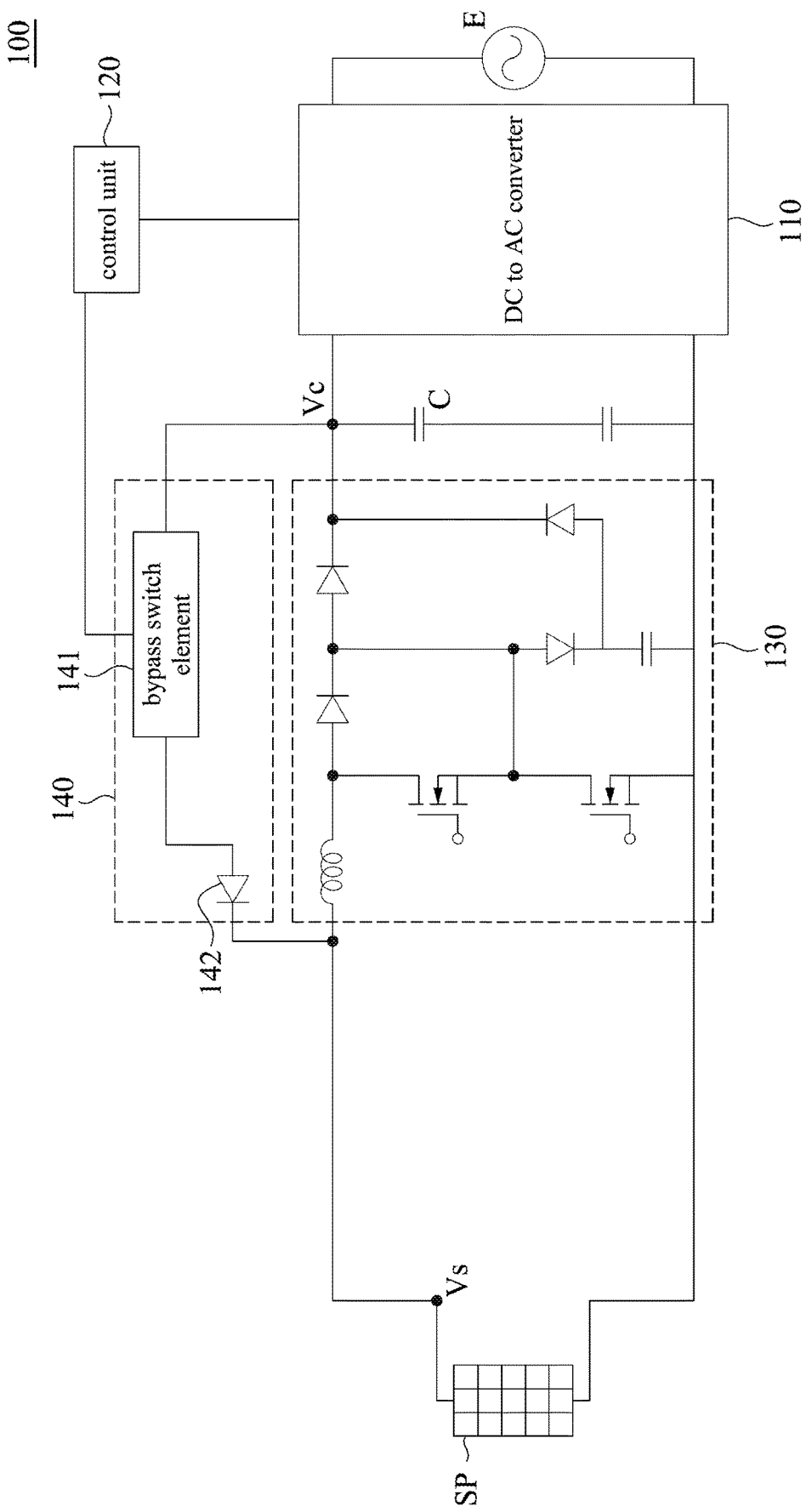
FIG. 2B is a schematic diagram of a solar power generation system according to one or more embodiments of the present disclosure.
Figure 3B:
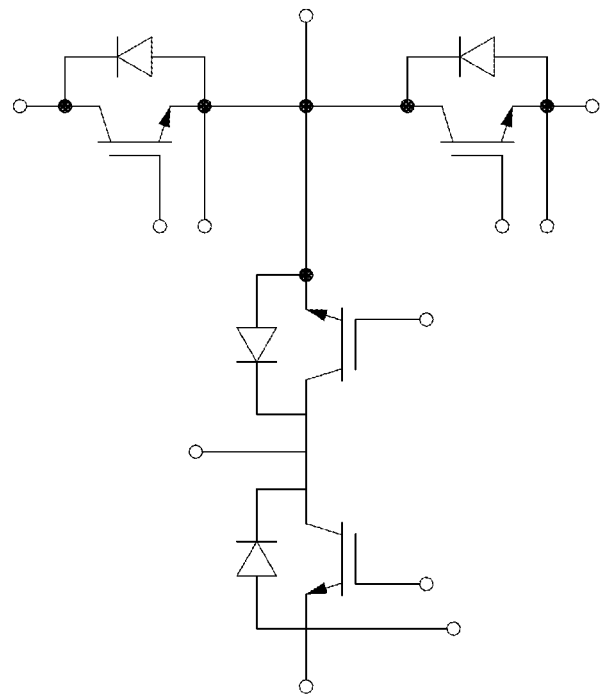
FIGS. 3A-3E are schematic diagrams of the DC to AC converter according to one or more embodiments of the present disclosure.
Figure 3A:
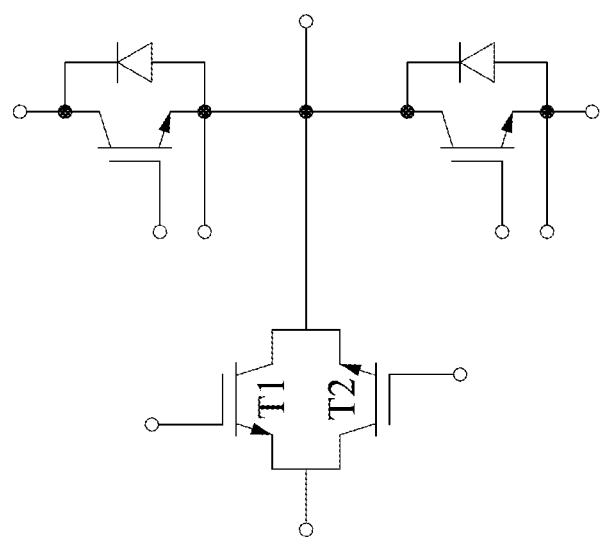
Figure 3D:
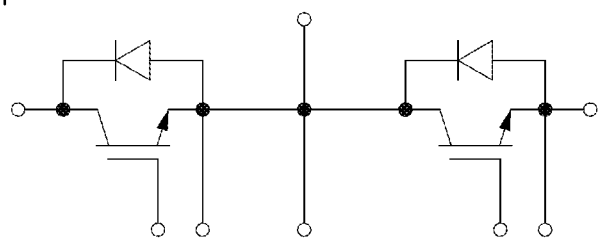
Figure 3C:
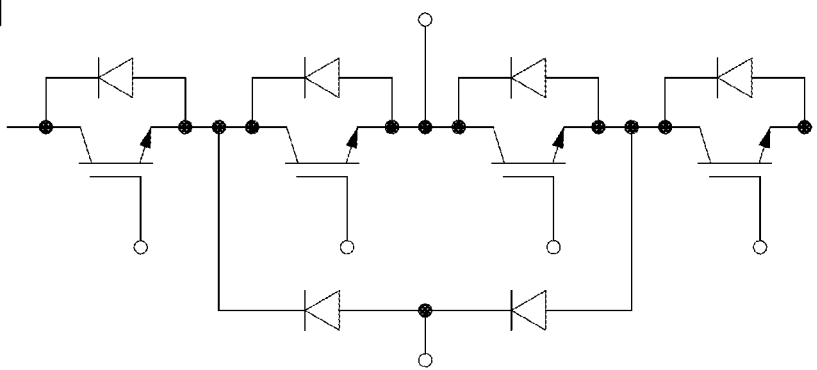
Figure 3E:
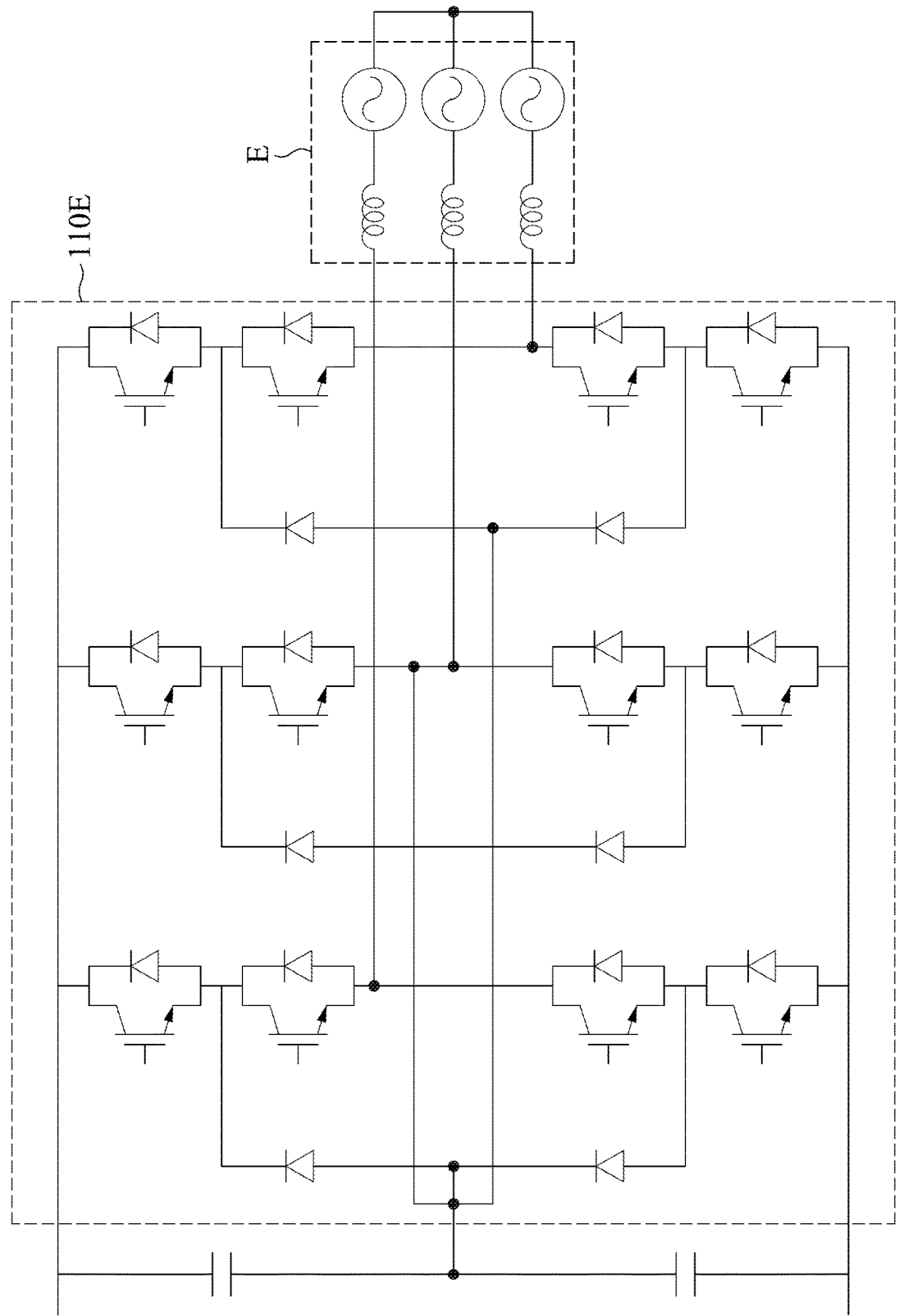

In FIGS. 2A and 2B, similar elements and principles related to the above embodiment of FIG. 1 that have been previously described are not repeated. As shown in FIG. 2A, in some embodiments, the solar power generation system 100 further includes a bypass switch circuit 140. The bypass switch circuit 140 is electrically coupled in parallel with the DC to DC converter 130 (illustrated by an example circuit structure), and is electrically coupled between the solar panel SP and the DC to AC converter 110. The control unit 120 is electrically coupled to the bypass switch circuit 140. When in the test mode, the control unit 120 controls the bypass switch circuit 140 to be turned on, so that the testing electrical energy is supplied to the solar panel SP via the bypass switch circuit 140. As shown in FIG. 2B, in some embodiments, the bypass switch circuit 140 includes a bypass switch element 141 and a unidirectional conduction element 142 (e.g., a diode). The bypass switch element 141 is electrically coupled to the control unit 120, and controlled by the control unit 120 to be turned on or off, so as to control the entire bypass switch circuit 140 to be turned on or off. The unidirectional conduction element 142 is configured to prevent the bypass switch circuit 140 from being abnormally turned on when the DC to AC converter 110 is in the power generation mode.

In some embodiments, the DC to DC converter 130 is a unidirectional DC to DC converter for converting the first DC voltage generated by the solar panel SP to the second DC voltage which is provided to the DC to AC converter 110. As shown in FIG. 2A, in some embodiments, the DC to DC converter 130 includes a diode 131 and an inductor 132, and the bypass switch circuit 140 is electrically coupled in parallel with the diode 131 and the inductor 132 of the DC to DC converter 130. The direction of the current flowing through the diode 131 is from the solar panel SP to the DC to AC converter 110. The circuit structure of the DC to DC converter 130 in the embodiment shown in FIG. 2B is different from that of the embodiment shown in FIG. 2A, and is also a unidirectional DC to DC converter to provide for the direction of the current flowing from the solar panel SP to the DC to AC converter 110.

FIGS. 3A through 3E are schematic diagrams of the DC to AC converter according to some embodiments of the present disclosure. The DC to AC converter 110 may also be a bidirectional DC to AC converter. The DC to AC converter 110A in FIG. 3A includes at least two transistor switches T1 and T2. The abovementioned control unit 120 may respectively control the transistor switches T1 and T2 to be turned on and off, so as to switch the input and output directions of the DC to AC converter 110. The circuit structures of the DC to AC converter 110B to 110E in the embodiment shown in FIGS. 3B through 3E are different from that shown in FIG. 3A, and are other examples of bidirectional DC to AC converter envisaged.

Figure 4:
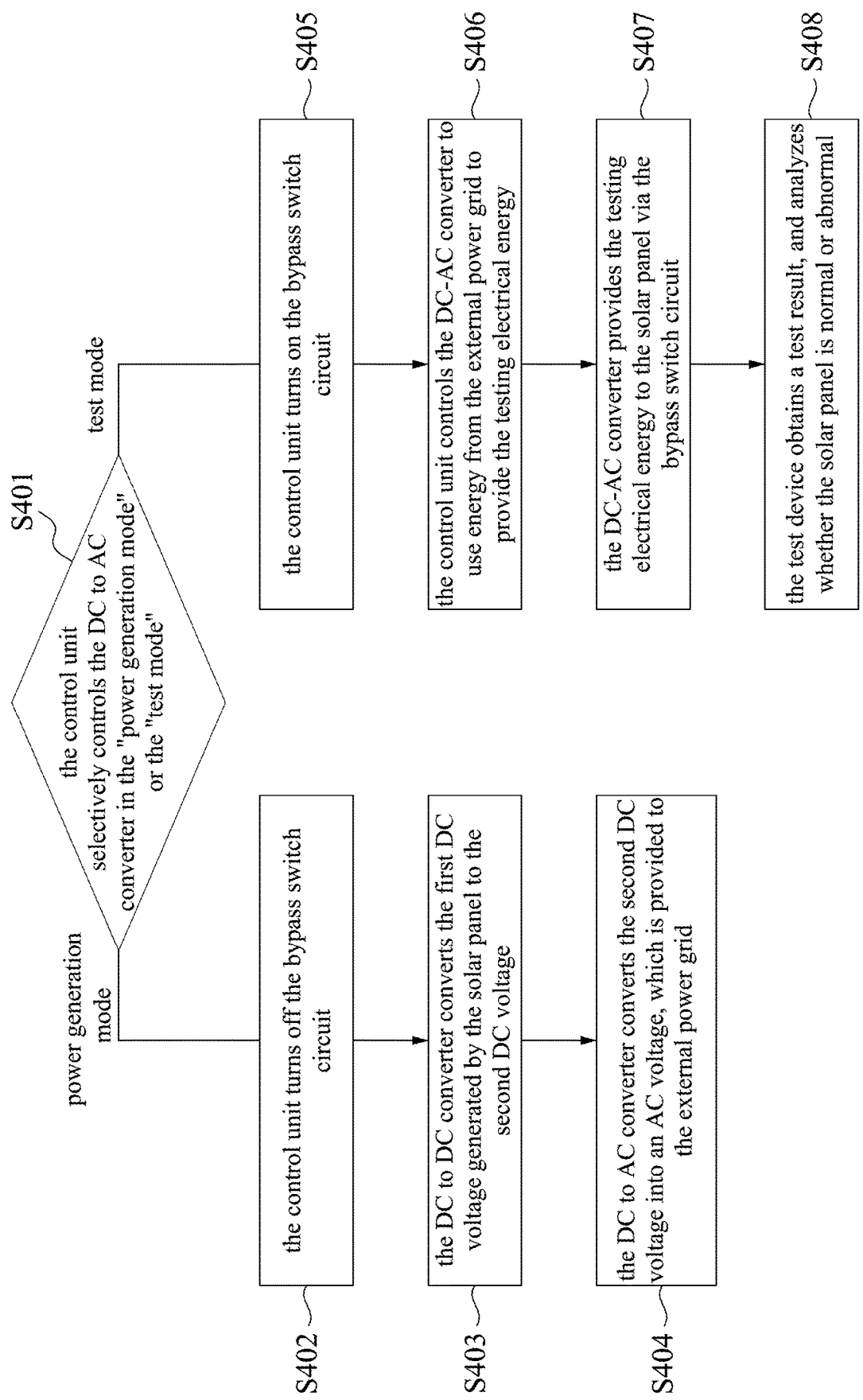
FIG. 4 is a flowchart illustrating a test method according to one or more embodiments of the present disclosure.

FIG. 4 together with FIGS. 2A-2B will now be used to describe different operation modes of the solar power generation system 100, including the power generation mode and the test mode, according to some embodiments of the present disclosure. As shown in FIG. 4, in step S401, the control unit 120 selectively controls the DC to AC converter 110 in the "power generation mode" or the "test mode". When the control unit 120 controls the DC to AC converter 110 in the "power generation mode", take step S402. In step S402, the control unit 120 turns off the bypass switch circuit 140. Next, in step S403, the DC to DC converter 130 converts the first DC voltage generated by the solar panel SP to the second DC voltage. In step S404, the DC to AC converter 110 converts the second DC voltage into an AC voltage, which is provided to the external power grid E.

When the control unit 120 controls the DC to AC converter 110 in the "test mode", take step S405. In step S405, the control unit 120 turns on the bypass switch circuit 140. Next, in step S406, the control unit 120 controls the DC to AC converter 110 to use energy from the external power grid E to provide the testing electrical energy. Then, in step S407, the DC to AC converter 110 provides the testing electrical energy to the solar panel SP via the bypass switch circuit 140. In step S408, the test device D tests/detects electrical or physical characteristics of the solar panel SP effected by the testing electrical energy (e.g. a hot spot at a damaged/fault location) to obtain a test result (e.g., a detection image), and the test device D further analyzes whether the solar panel SP is normal or abnormal (e.g. damaged).

In some embodiments, referring to FIGS. 2A and 2B, the control unit 120 detects a voltage difference between the DC to AC converter 110 and the solar panel SP, and controls the bypass switch circuit 140 to be in a turn-on state or in a turn-off state according to said voltage difference. In one embodiment, the control unit 120 is configured to detect whether the bus voltage Vc between the DC to AC converter 110 and the DC to DC converter 130 has become zero or close to zero (i.e., detect whether the cross-voltage of the energy storage capacitor C is zero or close to zero), so as to prevent potential damage that can be caused by the residual voltage to the internal circuits of the solar power generation system 100. In other embodiments, the control unit 120 detects whether the bus voltage Vc is equal (or close to equal) to the voltage of the connection node Vs of the solar panel SP, to determine whether there is residual voltage in the solar power generation system 100.

For example, when the DC to AC converter 110 ends the test mode to return to the power generation mode, the control unit 120 controls the DC to AC converter 110 to stop generating the testing electrical energy. The control unit 120 can detect whether the bus voltage Vc between the DC to AC converter 110 and the DC to DC converter 130 is returning to zero, or can also detect whether the bus voltage Vc is equal to the voltage of the connection node Vs of the solar panel SP. If the bus voltage Vc is zero, or if the bus voltage Vc is equal (or close to equal) to the voltage of the connection node Vs. Accordingly, the control unit 120 controls the bypass switch circuit 140 to switch from the turn-on state to the turn-off state. Similarly, if the power generation mode is set for a period of time and a user then changes the DC to AC converter 110 to be in the test mode, the control unit 120 will control the bypass switch circuit 140 to switch from the turn-off state to the turn-on state. Accordingly, the control unit 120 controls the DC to AC converter 110 to obtain the electrical energy from the external power grid E to generate the testing electrical energy, so as to allow a transmission of the testing electrical energy from the DC to AC converter 110 to the solar panel SP via the bypass switch circuit 140.

For the test mode, the control unit 120 can adjust a voltage level or a current value corresponding to the testing electrical energy. Referring to FIG. 2A, in some embodiments, the solar power generation system 100 also includes a current sensor 121. The current sensor 121 is electrically coupled to the control unit 120 and is configured to detect the current value supplied to the solar panel SP. The current sensor 121 provides the detected current value to the control unit 120, which is configured to adjust the current supplied to the solar panel SP according to the detected current value.

In some embodiments, the solar power generation system 100 includes a reference current value. By setting the reference current value, the current supplied to the solar panel SP will not be excessive so that the solar panel SP will not be damaged. The reference current value can be preset, be set by the user, or be adjusted at any time. Using the testing current value obtained by the current sensor 121, the control unit 120 compares the testing current value with the reference current value, and controls the DC to AC converter 110 according to the comparison result. The DC to AC converter 110 can change the magnitude of the output testing electrical energy, for example, when the testing current value is larger than the reference current value, the voltage level or current value corresponding to the testing electrical energy is reduced. When the testing current value is less than the reference current value, the voltage level or current value corresponding to the testing electrical energy is increased. In some embodiments, the reference current value is an ideal current range when the DC to AC converter 110 is in the "test mode". The value or range of the reference current value can be set by the user and can be adjustable in real-time.

Figure 5A:
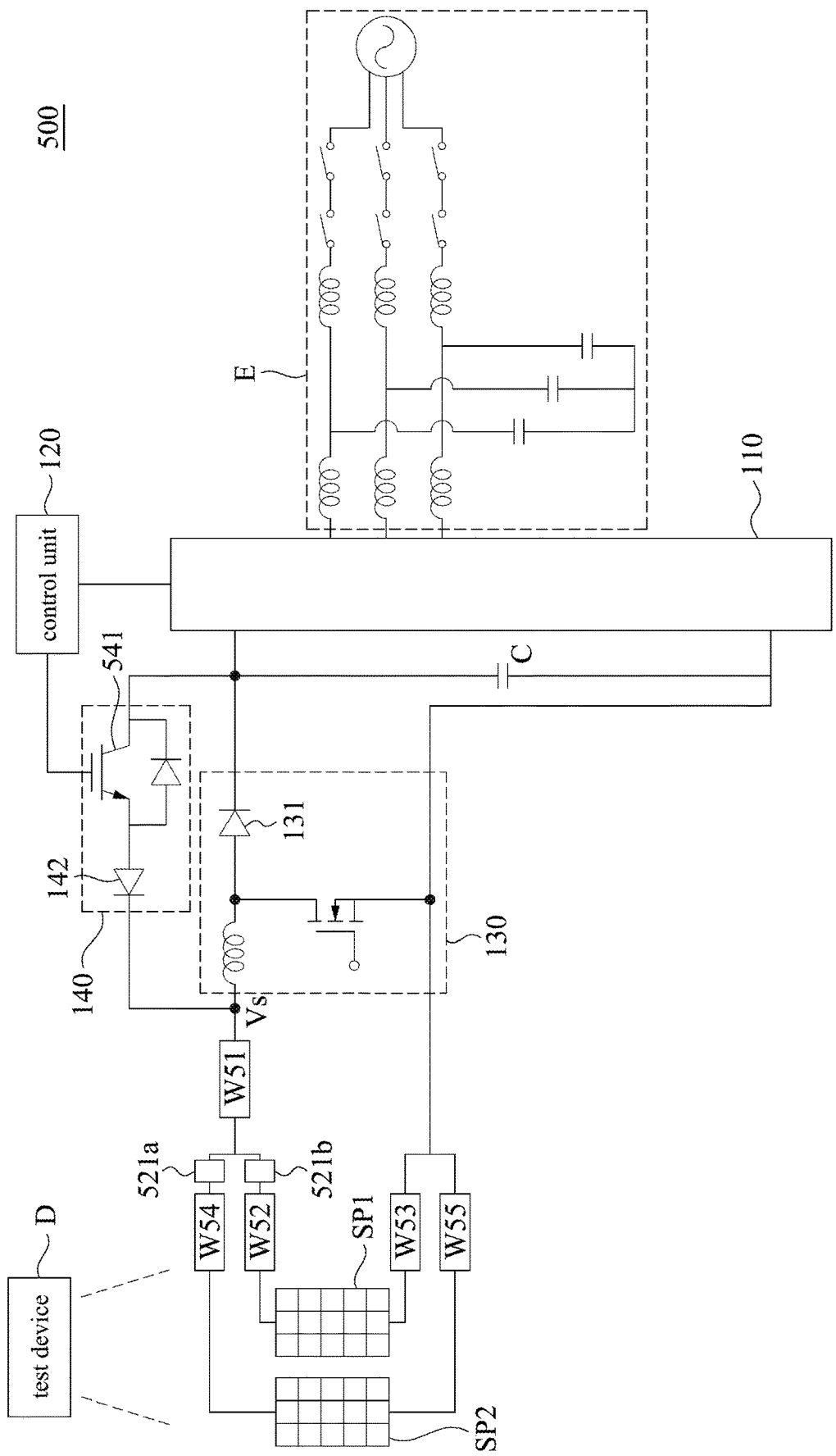
FIG. 5A is a schematic diagram of a solar power generation system according to one or more embodiments of the present disclosure.
Figure 5B:
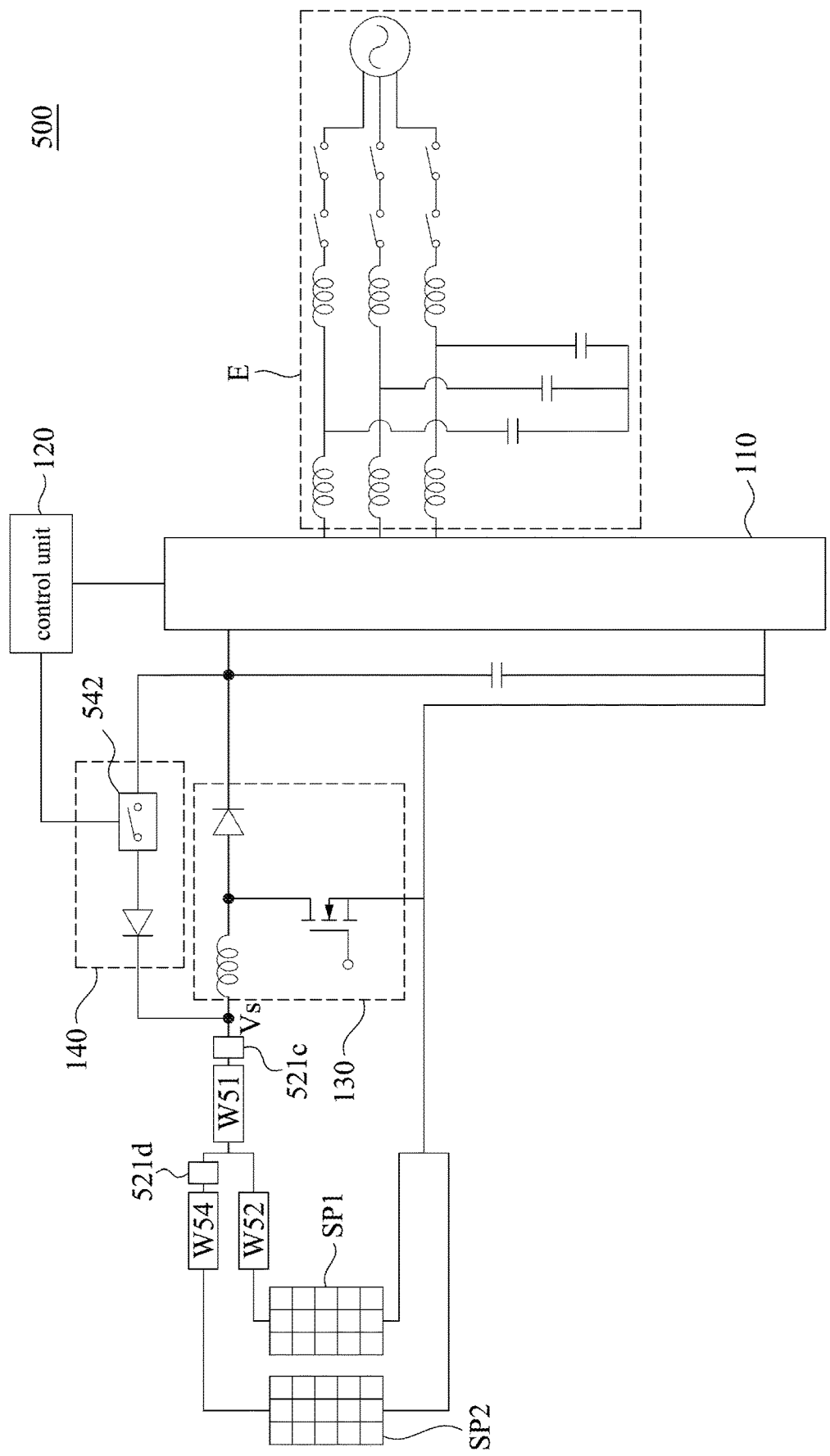
FIG. 5B is a schematic diagram of a solar power generation system according to one or more embodiments of the present disclosure.

The test mode/test method can be applied to test multiple solar panels. In FIGS. 5A and 5B, similar elements and principles related to the embodiment of FIG. 1 have been previously described. As shown in FIG. 5A, the solar power generation system 500 includes multiple switching elements W51-W55. The bypass switch circuit 140 is electrically coupled to the solar panel SP1 via the switching elements W51, W52, W53, and is electrically coupled to the other solar panel SP2 via the switching elements W51, W54, W55. The two solar panels SP1 and SP2 are electrically coupled in parallel with each other. In the test mode, if the switching elements W51-W55 are all turned on, the solar power generation system 500 can provide the testing electrical energy to both solar panels SP1 and SP2. The test device D (e.g., the thermal imager or the spectrum analyzer) can simultaneously detect the electrical characteristics or physical status of both solar panels SP1 and SP2.

If the switching elements W51, W52, W53 are turned on, and the switching elements W54, W55 are turned off, the solar power generation system 500 will only provide the testing electrical energy to the solar panel SP1. Similarly, if the switching elements W51, W54, and W55 are turned on, and the switching elements W52 and W53 are turned off, the solar power generation system 500 will only provide the testing electrical energy to the solar panel SP2. The control unit 120 may control the bypass switch circuit 140 to be switched between different states only when the voltage difference between the DC to AC converter 110 and the solar panel SP is zero. In other embodiments, as shown in FIG. 5B, the solar power generation system 500 is electrically coupled to the solar panels SP1 and SP2 via the switching elements W51, W52, W54 to selectively test different solar panels SP1 and SP2 (i.e., the switching elements W53 and W55 are not required). The operation of the switching elements W51, W52, W54 is similar to the above embodiments. In some embodiments, the bypass switch circuit 140 shown in FIGS. 5A and 5B may include a bidirectional switching element, such as an Insulated Gate Bipolar Transistor (IGBT) switch 541 or a relay 542, but not limited to the above.

In one embodiment, as shown in FIG. 5A, the solar power generation system 500 detects the value of the current passing through the switching elements W52 and W54 by current sensors 521a and 521b, respectively, and calculates a value of the current passing through the switching element W51. The operation of the current sensors 521a and 521b is the similar to the above embodiment described in FIG. 2A. The current sensors 521a and 521b are electrically coupled to the control unit 120, and provide the detection data to the control unit 120. In one embodiment, as shown in FIG. 5B, the solar power generation system 500 detects the value of the current passing through the switching elements W51 and W54 by the current sensors 521c and 521d, and calculates the value of the current passing through the switching element W52.

In some embodiments, the control unit 120 uses the testing current value obtained by all of the current sensors 521a and 521b. The control unit 120 compares all of the testing current values with the reference current value, controls the DC to AC converter 110 according to the comparison result and changes the voltage level or the current value corresponding to the testing electrical energy. In some embodiments, if one of the testing current values is greater than the reference current value (or if the control unit 120 finds that the largest testing current value is greater than the reference current value), the control unit 120 will control the DC to AC converter 110 to reduce the testing electrical energy. This method of control is useful for avoiding damage to the solar panels that are being tested.

Figure 6A:
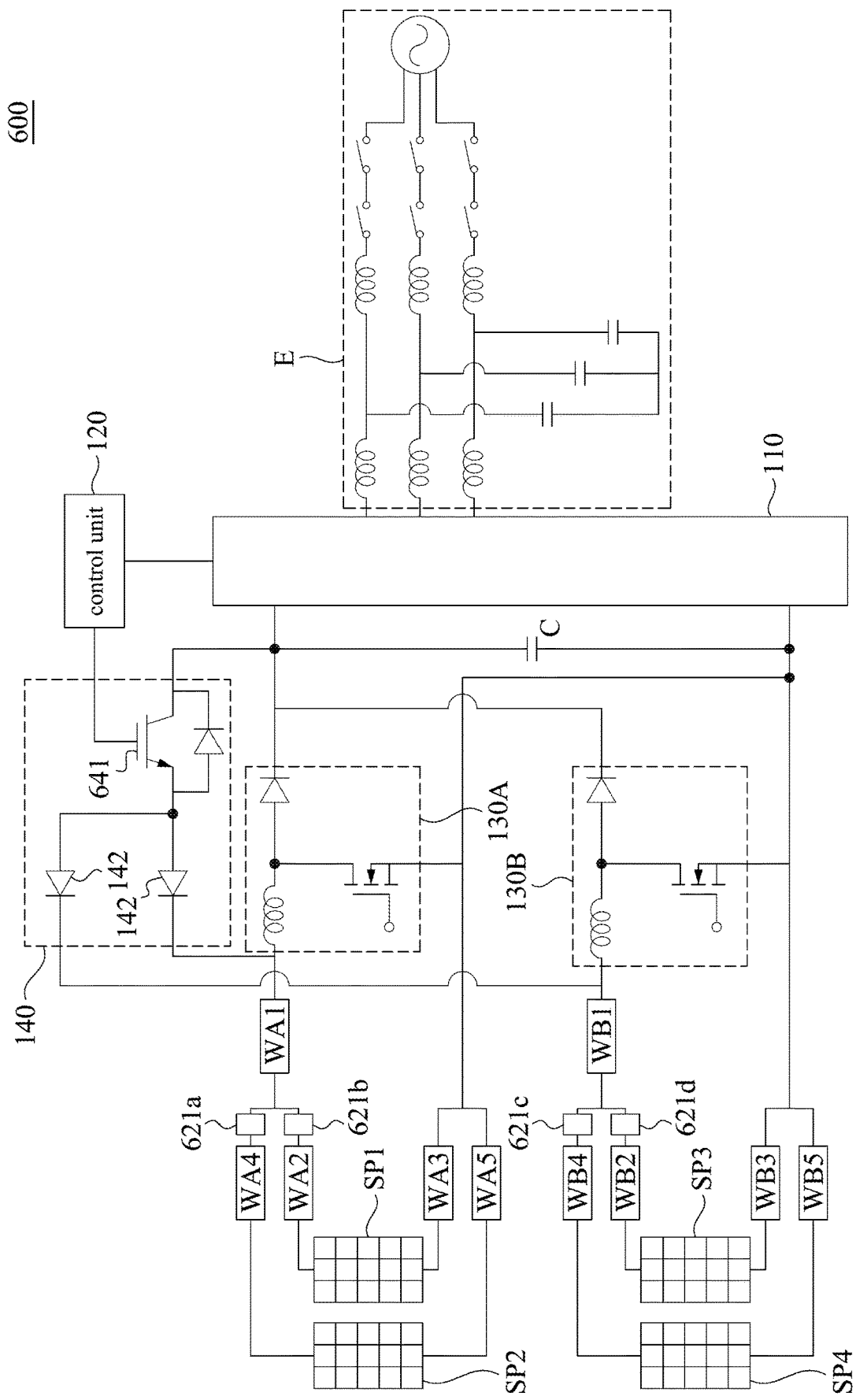
FIG. 6A is a schematic diagram of a solar power generation system according to one or more embodiments of the present disclosure.
Figure 6B:
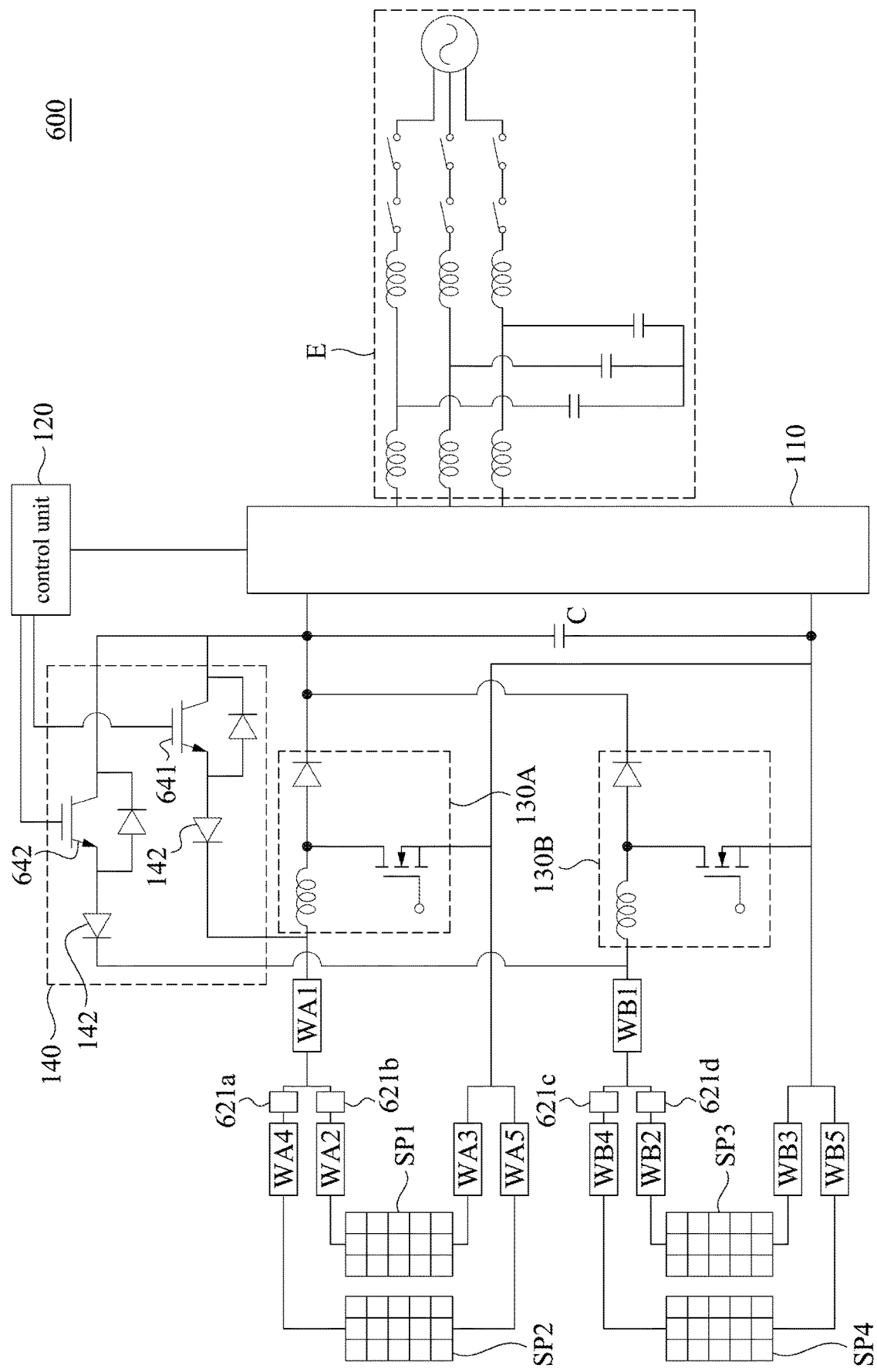
FIG. 6B is a schematic diagram of a solar power generation system according to one or more embodiments of the present disclosure.

When testing a large number of the solar panels, the efficiency of the DC to AC converter in the power generation mode can be improved by coupling the DC to AC converter of the solar power generation system in parallel with multiple sets of DC to DC converters, and also by coupling the multiple sets of DC to DC converters and multiple sets of solar panels in parallel. In FIGS. 6A and 6B, similar elements and principles related to the embodiment of FIG. 1 have been described previously.

As shown in FIG. 6A, the DC to AC converter 110 is electrically coupled to two sets of DC to DC converters 130A and 130B. The bypass switch circuit 140 is electrically coupled to the switching elements WA1 and WB1 through two paths, respectively. The switching element WA1 is electrically coupled to the solar panels SP1 and SP2 via the switching elements WA2 and WA4, respectively, and is electrically coupled to the switching elements WA3 and WA5. The switching element WB1 is electrically coupled to the solar panels SP3 and SP4 via the switching elements WB2 and WA4, respectively, and is electrically coupled to the switching elements WB3 and WB5. The bypass switch circuit 140 includes a bypass switch element 641 (e.g., IGBT switch) and two unidirectional conduction elements 142. When the bypass switch element 641 is controlled to be turned on by the control unit 120, the solar panels SP1-SP4 can be tested in a method similar to the above described embodiments. Similarly in FIG. 6B, the bypass switch circuit 140 includes two bypass switch elements 641 and 642 (e.g., IGBT switches) coupled to each other and a unidirectional conduction element 142. When the bypass switch element 641 and the corresponding switching elements WA1-WA5 are turned on, the solar power generation system 600 tests the solar panels SP1-SP2. On the other hand, when the bypass switch element 642 and the corresponding switching elements WB1-WB5 are turned on, the solar power generation system 600 tests the solar panels SP3-SP4. In some other embodiments, the solar power generation system 600 may include a group of bypass switch elements 641 and 642 for each of the solar panels SP1 and SP2, respectively, and is able to switch the solar panels SP1 and SP2 individually between the test mode and the power generation mode.

In one embodiment, as shown in FIGS. 6A and 6B, the solar power generation system 600 detects, by the current sensors 621a and 621b, the value of the current passing through the switching elements WA2 and WA4 coupled to the solar panel SP2, respectively, and calculates the value of the current passing through the switching elements WA1. Similarly, the solar power generation system 600 detects, by the current sensors 621c and 621d, the value of the current passing through the switching elements WB2 and WB4 coupled to the solar panel SP4, and calculates the value of the current passing through the switching element WB1. Further, the current sensor can be arranged between the switching elements WA1 and WA4, and used to calculate the value of the current passing through the switching element WA2.

Figure 7A:
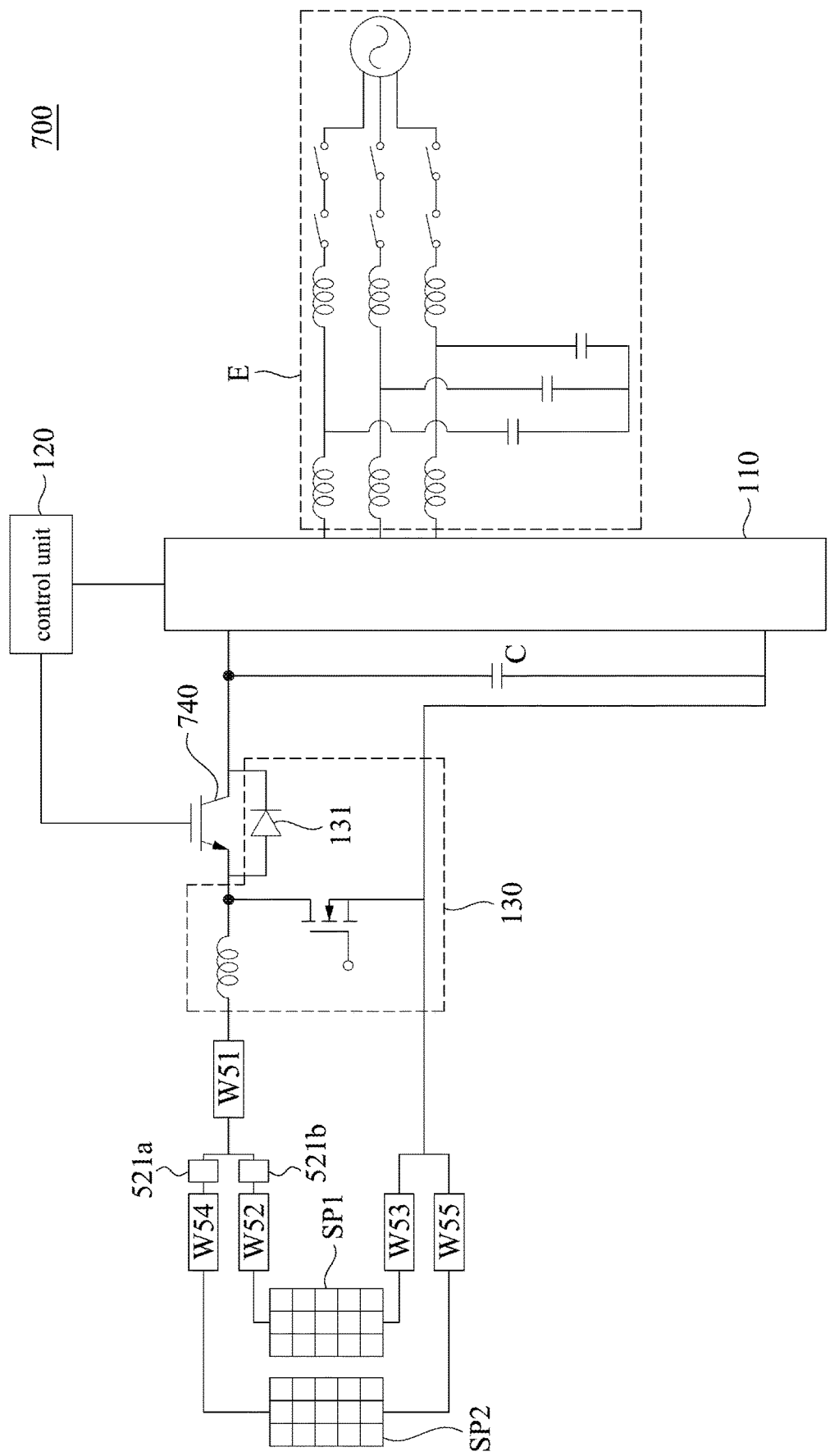
FIG. 7A is a schematic diagram of a solar power generation system according to one or more embodiments of the present disclosure.
Figure 7B:
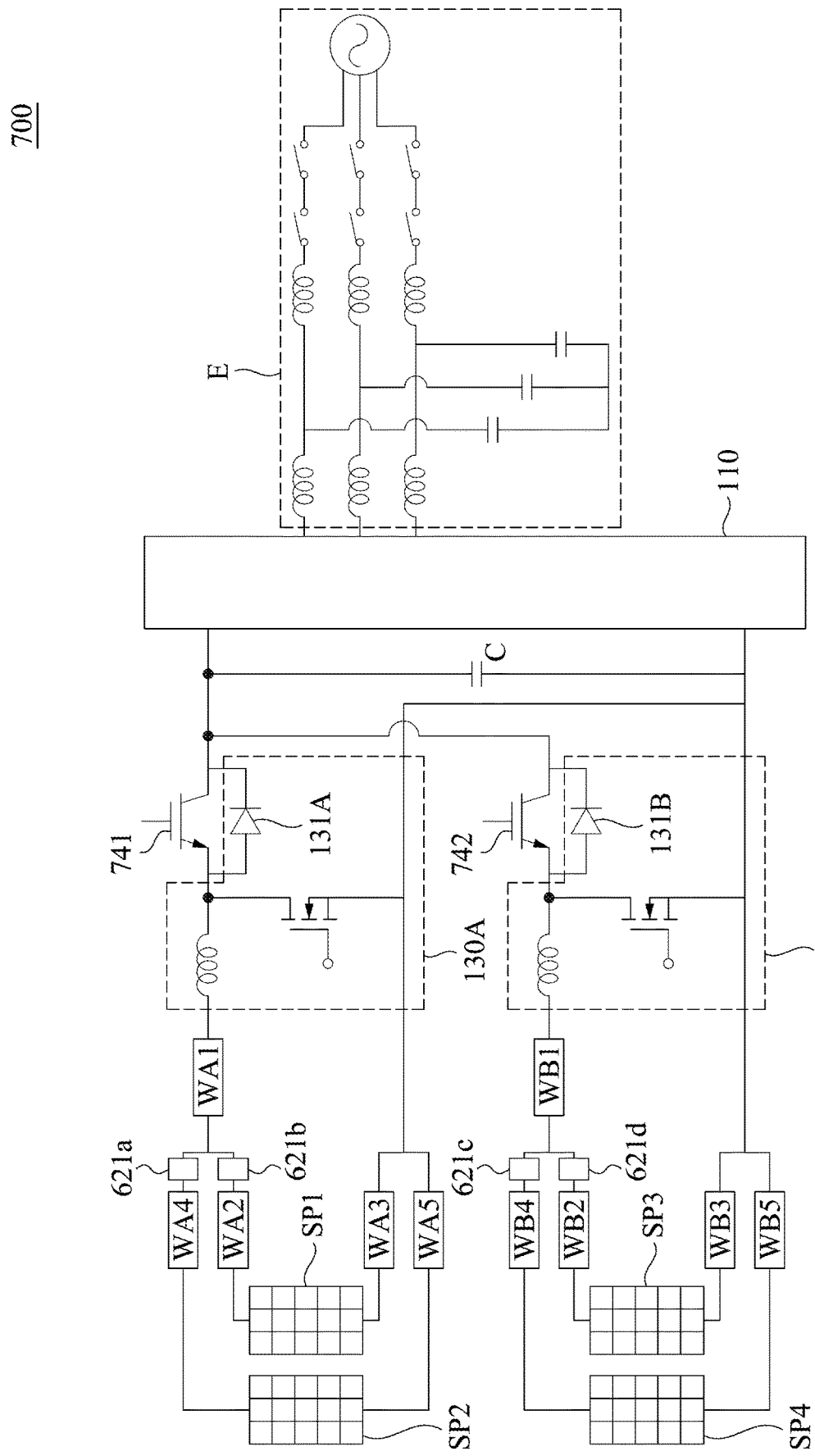
FIG. 7B is a schematic diagram of a solar power generation system according to one or more embodiments of the present disclosure.

The features of "bypass switch circuit" and the "bypass switch elements" in the present disclosure are not limited to those shown in FIGS. 1 through 6B. A circuit that can form a path, in the test mode, for transmitting the testing electrical energy between the DC to AC converter and the solar panel, can be used as the "bypass switch circuit" and the "bypass switch elements". In FIG. 7A, similar elements and principles related to the embodiment of FIG. 5A have been previously described. As shown in the figure, in some embodiments, the bypass switch circuit 740 may be implemented in or implemented by the IGBT switch. In the test mode, the control unit 120 controls the IGBT switch to be turned on, so that the testing electrical energy is transmitted to the solar panel SP1 or the solar panel SP2 via the bypass switch circuit 740. The DC to DC converter 130 in the solar power generation system 700 includes a diode 131. At this time, the parasitic diode in the IGBT switch can be used as the diode. Specifically, the diode 131 may be implemented by a parasitic diode of the IGBT switch in the bypass switch circuit 740. The diode 131 and the IGBT switch are also coupled in parallel (similar to the circuit in FIG. 5A). FIG. 7B is a schematic diagram of the solar power generation system 700 according to different embodiments of the present disclosure. Similar components and principles related to the embodiment of FIG. 6B have been previously described. The bypass switch circuit shown in the figure includes bypass switch elements 741 and 742. The parasitic diodes in the bypass switch elements 741 and 742 can be used as the diodes 131A and 131B in the DC to DC converters 130A and 130B, respectively.

Figure 8:
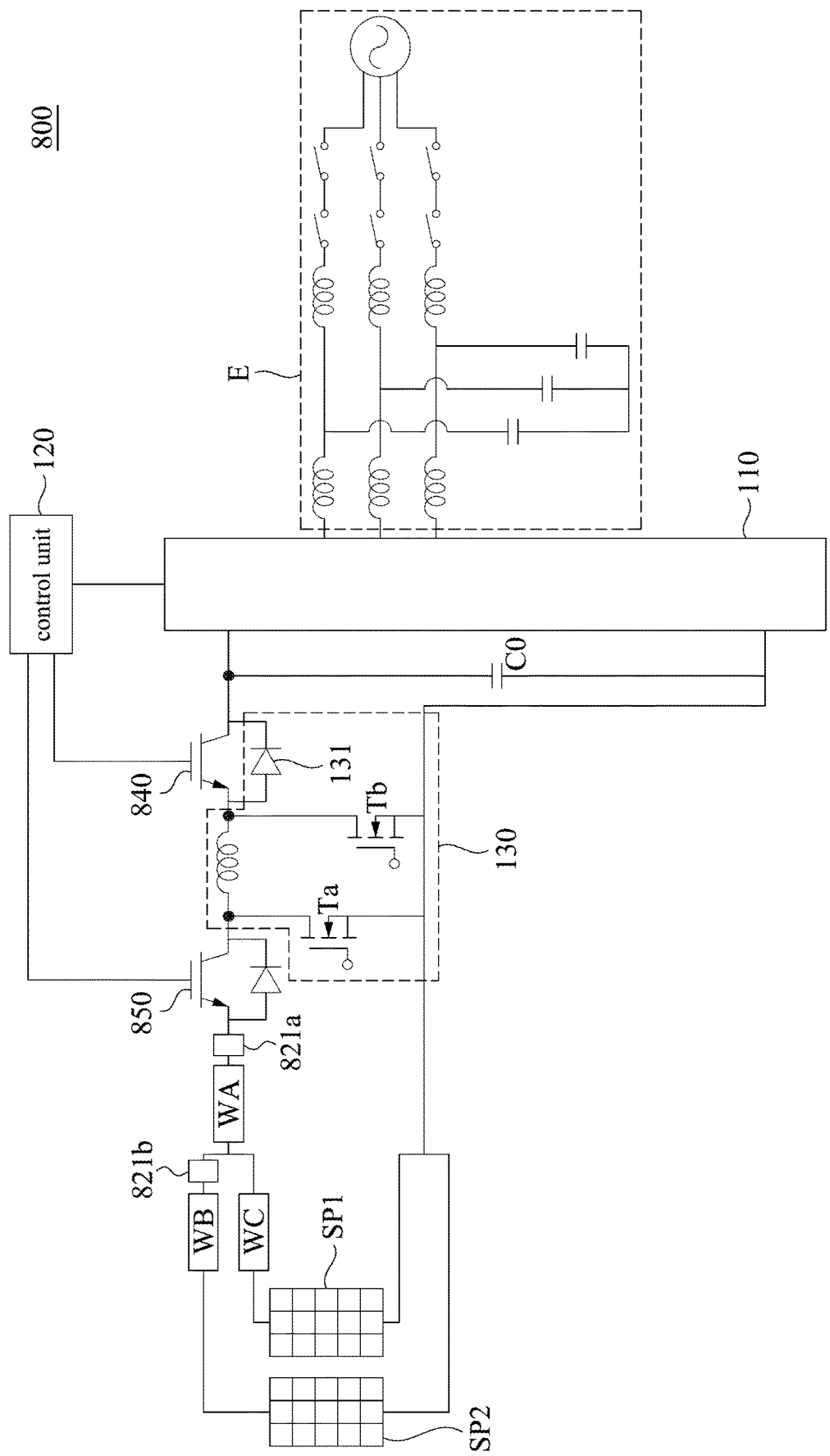
FIG. 8 is a schematic diagram of a solar power generation system according to one or more embodiments of the present disclosure.

As shown in FIG. 8, in this embodiment, the bypass switch circuit 840 and the DC to DC converter 130 of the solar power generation system 800 are electrically coupled to a controlled switch 850 and switching elements WA, WB, WC. In addition, the DC to DC converter 130 also includes two switching switches Ta and Tb. The control terminals of the switches Ta and Tb are electrically coupled to the control unit 120, and are controlled by the control unit 120 to be turned on or off. In the power generation mode, the switching elements WA, WB, WC and switches Ta, Tb are controlled to be turned on, and the bypass switch circuit 840 and controlled switch 850 are turned off. At this time, the parasitic diode in the bypass switch circuit 840 will be used as the diode 131 in the DC to DC converter 130. The photoelectric energy generated by the solar panels SP1 and SP2 can be outputted to the external power grid E through the parasitic diode of the controlled switch 850, the DC to DC converter 130, and the DC to AC converter 110. Alternatively stated, the diode 131 is configured to allow transmission of the photoelectric energy from the solar panels SP1 and/or SP2 to the DC to AC converter 110.

In the test mode, the bypass switch circuit 840, the controlled switch 850, the switching elements WA, WB, WC are turned on, and the switching switches Ta and Tb are turned off, so that the DC to DC converter 130 is turned off. The DC to AC converter 110 uses energy from the external power grid E for providing the testing electrical energy to the solar panels SP1 and SP2 via the bypass switch circuit 840 and the turned-on controlled switch 850.

Similar to the previous embodiments, in one embodiment as shown in FIG. 8, the solar power generation system 100 detects the value of the current passing through the switching elements WA and WB coupled to the solar panel SP2 using the current sensors 821a and 821b, respectively, and can calculate the value of the current passing through the switching element WC.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A test method for testing a solar power generation system, wherein the solar power generation system comprises a solar panel and a direct-current to alternating-current (DC to AC) converter, wherein when the DC to AC converter is in a power generation mode, a photoelectric energy generated by the solar panel is provided to an external power grid via the DC to AC converter, the test method comprises:

providing the DC to AC converter in a test mode, wherein the test mode is different to the power generation mode;

controlling the DC to AC converter to obtain an electrical energy from the external power grid and to generate a testing electrical energy; and providing the testing electrical energy to the solar panel, so that a test device obtains a test result of the solar panel when the testing electrical energy passes through the solar panel.

2. The test method of claim 1, wherein the solar power generation system further comprises a direct-current to direct-current (DC to DC) converter electrically coupled between the solar panel and the DC to AC converter, wherein when the DC to AC converter is in the power generation mode, the DC to DC converter converts a first DC voltage into a second DC voltage, and the second DC voltage is converted by the DC to AC converter into an output AC voltage provided to the external power grid, the test method further comprises:

providing a bypass switch circuit electrically coupled between the solar panel and the DC to AC converter, wherein the bypass switch circuit is electrically coupled in parallel with the DC to DC converter; and when the DC to AC converter is in the test mode, controlling the bypass switch circuit to be turned on, so that the testing electrical energy is transmitted from the DC to AC converter to the solar panel via the bypass switch circuit.

3. The test method of claim 2, wherein the DC to AC converter is configured to change from the power generation mode to the test mode, the test method further comprises:

controlling the bypass switch circuit to switch from a turn-off state to a turn-on state to allow a transmission of the testing electrical energy from the DC to AC converter to the solar panel via the bypass switch circuit.

4. The test method of claim 3, wherein the DC to AC converter is configured to end the test mode to return to the power generation mode, the test method comprises:

controlling the DC to AC converter to stop generating the testing electrical energy;

detecting a voltage difference between the DC to AC converter and the solar panel; and controlling the bypass switch circuit to switch from a turn-on state to a turn-off state to end the test mode.

5. The test method of claim 1, wherein the solar power generation system further comprises an energy storage capacitor electrically coupled between the solar panel and the DC to AC converter, and wherein the energy storage capacitor cooperates with the DC to AC converter to provide the testing electrical energy to the solar panel when the DC to AC converter is in the test mode.

6. The test method of claim 1, further comprising:

detecting a value of the testing electrical energy provided to the solar panel when the DC to AC converter is in the test mode.

7. The test method of claim 6, further comprising:

providing a current sensor for detecting a testing current value of the testing electrical energy;

comparing the testing current value supplied by the current sensor with a reference current value to generate a comparison result; and controlling the DC to AC converter according to the comparison result to adjust a voltage level or a current value corresponding to the testing electrical energy.

8. The test method of claim 1, further comprising:

using a thermal imager or a spectrum analyzer to capture a detection image of the solar panel receiving the testing electrical energy; and analyzing the detection image to determine if a status of one or more parts of the solar panel is normal or abnormal.

9. A solar power generation system, comprising:
a DC to AC converter electrically coupled between an external power grid and a solar panel; and
a control unit electrically coupled to the DC to AC converter, and configured to control the DC to AC converter to be switched between a power generation mode and a test mode,
wherein when the DC to AC converter is in the power generation mode, a photoelectric energy generated by the solar panel is provided to the external power grid via the DC to AC converter, and
wherein when the DC to AC converter is in the test mode, the control unit controls the DC to AC converter to generate a testing electrical energy by obtaining energy from the external power grid, and provide the testing electrical energy to the solar panel to effect a test result of the solar panel when the testing electrical energy passes through the solar panel.

10. The solar power generation system of claim 9, wherein the solar power generation system further comprises a DC to DC converter electrically coupled between the solar panel and the DC to AC converter, wherein the DC to DC converter is configured to generate a first DC voltage and convert the first DC voltage into a second DC voltage when the DC to AC converter is in a power generation mode, and wherein the DC to AC converter is configured to convert the second DC voltage into an output AC voltage provided to the external power grid.

11. The solar power generation system of claim 10, wherein the DC to DC converter is a unidirectional DC to DC converter configured to receive the first DC voltage from the solar panel and generate the second DC voltage as an output to the DC to AC converter.

12. The solar power generation system of claim 10, wherein the solar power generation system further comprises a bypass switch circuit electrically coupled in parallel with the DC to DC converter and between the solar panel and the DC to AC converter,
and wherein the bypass switch circuit is further electrically coupled to the control unit such that when the DC to AC converter is in the test mode, the control unit controls the bypass switch circuit to be turned on to allow a transmission of the testing electrical energy from the DC to AC converter to the solar panel via the bypass switch circuit.

13. The solar power generation system of claim 12, wherein the DC to DC converter comprises a diode electrically coupled in parallel with the bypass switch circuit, the diode is configured to allow a transmission of a photoelectric energy from the solar panel to the DC to AC converter.

14. The solar power generation system of claim 13, wherein the DC to DC converter further comprises an inductor, and wherein the bypass switch circuit is electrically coupled in parallel with the diode and the inductor of the DC to DC converter.

15. The solar power generation system of claim 12, wherein the DC to AC converter is configured to change from the power generation mode to the test mode by the control unit controlling the bypass switch circuit to switch from a turn-off state to a turn-on state, and further controlling the DC to AC converter to obtain an energy from the external power grid to generate the testing electrical energy.

16. The solar power generation system of claim 15, wherein the DC to AC converter is further configured to end the test mode to return to the power generation mode, the control unit:
controlling the DC to AC converter to stop generating the testing electrical energy;
detecting a voltage difference between the DC to AC converter and the solar panel; and
controlling the bypass switch circuit to switch from the turn-on state to the turn-off state.

17. The solar power generation system of claim 9, further comprising:
an energy storage capacitor electrically coupled between the solar panel and the DC to AC converter, wherein the energy storage capacitor is configured to cooperate with the DC to AC converter to provide the testing electrical energy to the solar panel when the DC to AC converter is in the test mode.

18. The solar power generation system of claim 9 further comprising:
a current sensor configured to detect a testing current value of the testing electrical energy provided to the solar panel when the DC to AC converter is in the test mode.

19. The solar power generation system of claim 18, wherein the control unit is further configured to compare the testing current value with a reference current value to generate a comparison result; and control the DC to AC converter according to the comparison result to adjust a voltage level or a current value corresponding to the testing electrical energy.

20. The solar power generation system of claim 9, wherein the DC to AC converter is a bidirectional DC to AC converter.

* * * * *